(12) United States Patent
Crisfield et al.

(10) Patent No.: US 6,776,052 B2
(45) Date of Patent: Aug. 17, 2004

(54) CORIOLIS FLOWMETER HAVING A REDUCED FLAG DIMENSION FOR HANDLING LARGE MASS FLOWS

(75) Inventors: Matthew T. Crisfield, Boulder, CO (US); John Richard McCarthy, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/430,052

(22) Filed: Oct. 29, 1999

(65) Prior Publication Data

US 2002/0157479 A1 Oct. 31, 2002

(51) Int. Cl.[7] .................................................. G01F 1/84
(52) U.S. Cl. .............................. 73/861.354; 73/861.355
(58) Field of Search ..................... 73/861.354, 861.355, 73/861.356, 861.351, 861.357

(56) References Cited

U.S. PATENT DOCUMENTS

| | | | |
|---|---|---|---|
| 4,768,385 A | | 9/1988 | Cage |
| 4,823,614 A | | 4/1989 | Dahlin |
| 4,856,346 A | | 8/1989 | Kane |
| 4,876,898 A | * | 10/1989 | Cage et al. ............ 73/861.355 |
| 4,895,031 A | * | 1/1990 | Cage ..................... 73/861.355 |
| 5,394,758 A | * | 3/1995 | Wenger et al. ......... 73/861.355 |
| 5,549,009 A | * | 8/1996 | Zaschel ................. 73/861.355 |
| 5,663,509 A | * | 9/1997 | Lew et al. ............. 73/861.357 |
| 5,705,754 A | | 1/1998 | Keita et al. |
| 5,796,011 A | * | 8/1998 | Keita et al. ............ 73/861.357 |
| 6,308,580 B1 | * | 10/2001 | Crisfield et al. ....... 73/861.355 |

FOREIGN PATENT DOCUMENTS

| | | |
|---|---|---|
| EP | 0 553 939 A2 | 8/1993 |
| EP | 0 598 287 A1 | 5/1994 |
| EP | 1 001 254 A1 | 5/2000 |
| WO | PCT/US00/06748 | 9/2000 |

OTHER PUBLICATIONS

US 6,044,715, 4/2000, Ollila et al. (withdrawn)*
(1997)Meriam Websters Collegiate Dictionary. Meriam-–Webster Inc. p. 1174.*

* cited by examiner

Primary Examiner—Edward Lefkowitz
Assistant Examiner—Lilybett Martir
(74) Attorney, Agent, or Firm—Duft Setter Ollila & Bornsen LLC

(57) ABSTRACT

A Coriolis flowmeter sensor capable of handling large mass flow rates and having a reduced flag dimension. In order to have a reduced flag dimension, each of the flow tubes forms a semicircle between an inlet and an outlet. Brace bars, connected to the flow tubes proximate the inlet and outlet, separate the frequencies of vibration in the flow tubes. Pick-offs are positioned on the flow tubes at a position that allows the pickoffs to maximize detection of low amplitude, high frequency vibrations of the flow tubes required to have a reduced flag dimension.

11 Claims, 3 Drawing Sheets

CORIOLIS FLOWMETER HAVING A REDUCED FLAG DIMENSION FOR HANDLING LARGE MASS FLOWS

FIELD OF THE INVENTION

This invention relates to Coriolis flowmeters. More particularly, this invention relates to reducing a flag dimension of a Coriolis flowmeter by using flow tubes having a substantially semicircular arc and one set of brace bars. Still more particularly, this invention relates to a configuration of components that maintains zero stability and reduces the amplitude of the vibrating flow tubes to reduce stress applied to the brace bars.

Problem

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and U.S. Pat. No. Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending, torsional, or coupled type. Each flow tube is driven to oscillate at resonance in one of these natural modes. The natural vibration modes of the vibrating, material filled system are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a force to the flow tube in order to cause the flow tubes to oscillate in a desired mode of vibration. Typically, the desired mode of vibration is a first out of phase bending mode. When no material is flowing through the flowmeter, all points along a flow tube oscillate with an identical phase. As the material begins to flow, Coriolis accelerations cause each point along the flow tube to have a different phase with respect to other points along the flow tube. The phase on the inlet side of the flow tube lags the driver, while the phase on the outlet side leads the driver. Sensors are placed on the flow tube to produce sinusoidal signals representative of the motion of the flow tube. The phase difference between the two sensor signals is proportional to the mass flow rate of the material flowing through the flow tube or flow tubes. Electronic components connected to the sensor then use the phase difference and frequencies of the signals to a determine mass flow rate and other properties of the material.

An advantage that Coriolis flowmeters have over other mass flow measurement devices is that flowmeters typically have less than 0.1% error in the calculated mass flow rates of a material. Other conventional types of mass flow measurement devices such as orifice, turbine, and vortex flowmeters, typically have 0.5% or greater errors in flow rate measurements. Although Coriolis mass flowmeters have greater accuracy than the other types of mass flow rate devices, the Coriolis flowmeters are also more expensive to produce. Users of flowmeters often choose the less expensive types of flowmeters preferring to save cost over accuracy. Therefore, makers of Coriolis flowmeters desire a Coriolis flowmeter that is less expensive to manufacture and determines mass flow rate with an accuracy that is within 0.5% of the actual mass flow rate in order to produce a product that is competitive with other mass flow rate measurement devices.

One reason that Coriolis meters are more expensive than other devices is the need for components that reduce the number of unwanted vibrations applied to the flow tubes. One such component is a manifold which affixes the flow tubes to a pipeline. In a dual tube Coriolis flowmeter, the manifold also splits the flow of material received from a pipeline into two separate flows and directs the flows into separate flow tubes. In order to reduce the vibrations caused by outside sources, such as a pump, that are connected to the pipeline, a manifold must have a stiffness that is sufficient enough to absorb the vibrations. Most conventional manifolds are made of cast metal in order to have a sufficient mass. Furthermore, there is a spacer between the manifolds that maintains the spacing between inlet and outlet manifolds. This spacer is also made out of a metal or other stiff material in order prevent outside forces from vibrating the flow tubes. The large amount of metal used to create these castings increases the cost of the flowmeter. However, the elimination of unwanted vibrations greatly increases the accuracy of the flowmeters.

A second problem for those skilled in the Coriolis flowmeter art is that flowmeters may have a flag dimension that is too big to be used in certain applications. For purposes of this discussion, flag dimension is the length that a flow tube loop extends outward from a pipeline. There are environments where space is constrained or is at a premium. A flowmeter having a typical flag dimension will not fit in these confined areas.

It is a particular problem to reduce the flag dimension of flow tubes in a Coriolis flowmeters that handle large flow rates. For purposes of this discussion, large flow rates are 700 lbs./minute or greater. One reason that reducing the flag dimension is a problem in flowmeter handling larger flow rates is that the flow tubes must have larger diameters. Larger diameter flow tubes have higher drive frequencies than smaller diameter flow tubes and are harder to design when reducing the flag dimension. The larger diameter of the flow tube also causes zero stability problems when a smaller flag dimension is created. For these reasons, it is a particular problem to create a dual flow tube Coriolis flowmeter capable of handling large flow rates.

Solution

The above and other problems are solved and an advance in the art is made by the provision of a Coriolis flowmeter having a reduced flag dimension in the present invention. The Coriolis flowmeter of the present invention has flow tubes that are capable of handling large mass flow rates. The Coriolis flowmeter of the present invention does not have a conventional manifold and spacer. Instead, the spacer substantially surrounds the manifolds. This configuration reduces the cost of the flowmeter. The Coriolis flowmeter of the present invention also has a reduced flag dimension which allows the Coriolis flowmeter of the present invention to be used in areas where space is at a premium and it would be impossible to use a conventional Coriolis flowmeter having a conventional flag dimension.

The flag dimension of the flow tube is reduced by forming the flow tubes in a semicircle between inlet ends and outlet ends of the flow tubes. The semicircle shape of the flow tubes reduces the rise of flow tube to reduce the flag height. In order to increase the accuracy of the flowmeter, the entire length of the semicircle must vibrate.

A driver is affixed to the flow tubes at a position along each flow tube that is substantially perpendicular to a plane containing the inlet end and the outlet end of the flow tube. The driver is positioned at this point to minimize the amount of energy applied to the flow tubes by the driver to cause the flow tubes to oscillate. Drive signals are applied to the driver to cause the driver to oscillate the flow tubes at a low amplitude to reduce the stress applied to brace bars affixed to the flow tubes. The driver must also drive the flow tubes to vibrate at a frequency that is higher than conventional flow tubes.

To separate vibrations modes in the flow tube while the flow tube is being oscillated, a first brace bar is affixed to the flow tubes proximate the inlet ends and a second brace bar is affixed to the flow tubes proximate the outlet ends. Brace bars are metal components that are affixed to each of the flow tubes at substantially the same location along the flow tubes.

In order to sense Coriolis effect in the oscillating flow tubes, the pick-off sensors have to be affixed to the flow tubes in a position that allows the sensors to detect the greatest amount of Coriolis force at a low amplitude vibration. This allows a lower amplitude vibration to be used in order to reduce the stress applied to the brace bar.

An inlet manifold and an outlet manifold may be affixed to the inlet and outlet ends of the flow tube to connect the flow tubes to a pipeline. Each manifold is a separate component that is cast separately to reduce the cost of material. Each manifold may have a flow path that bends substantially 90 degrees to connect the inlet and outlet ends of the semicircular arc to a pipeline.

A spacer is affixed to each of the manifolds to maintain the distance between the manifolds. The spacer is a structure having four sides with opposing ends affixed to the inlet and outlet manifolds. The spacer encloses a hollow cavity. This reduces the amount of material used in casting the manifold. Openings in the top side of the spacer allow the manifold to connect to the semicircular arc of the flow tubes which protrude outward from the spacer.

A casing may be affixed to the top side of the spacer to enclose the flow tubes. It is a problem that the casing may resonate a frequency that is close to the frequency of the vibrating flow tubes. This may cause inaccuracies in the readings of properties of material flowing through the flow tube. To change the resonant frequency of the case, a mass may be affixed to the casing to change the resonant frequency of the case.

DESCRIPTION OF THE DRAWINGS

The above and other features can be understood from detailed description below and the following drawings.

Figure 1:
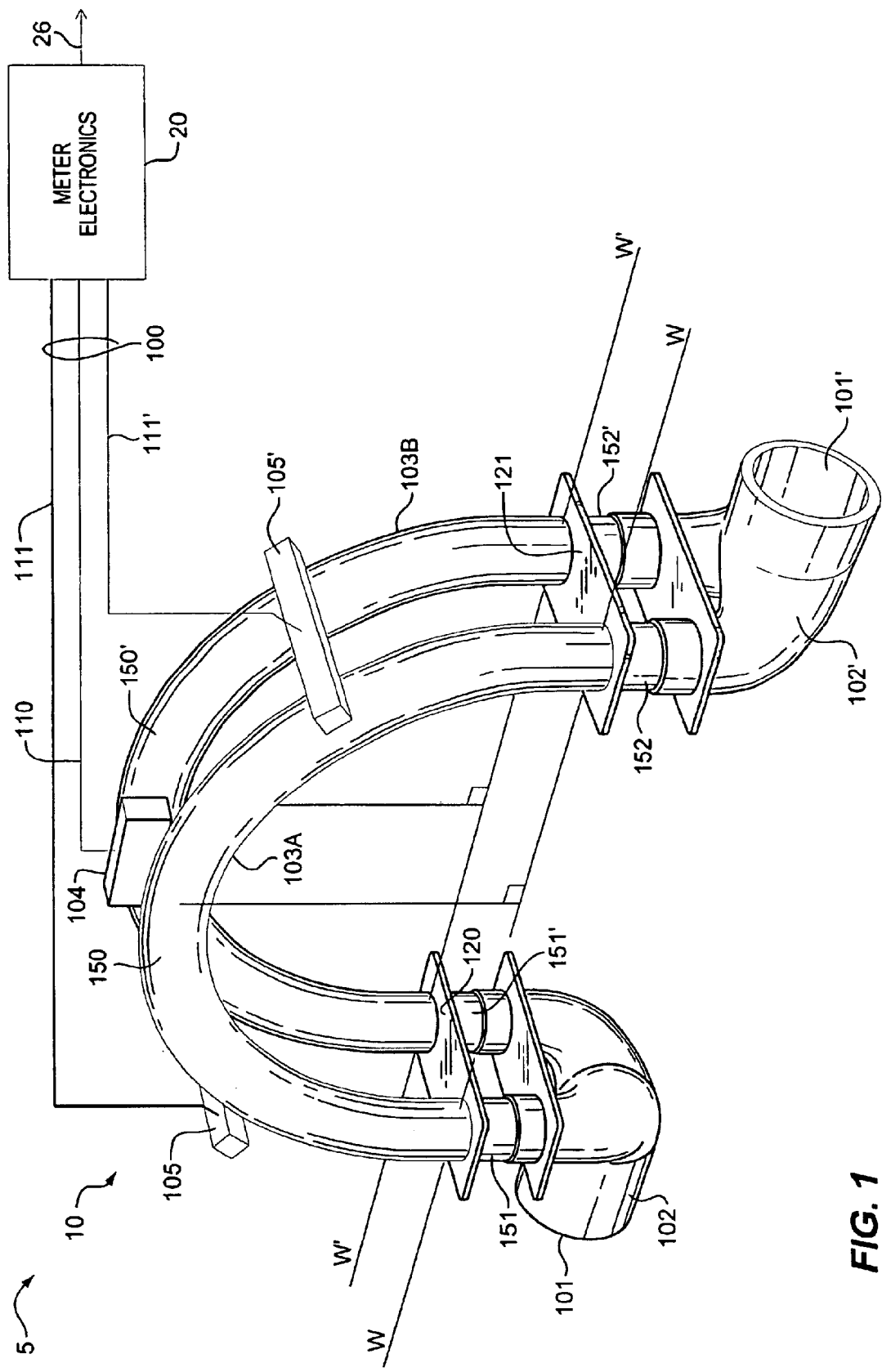
FIG. 1 illustrating a Coriolis flowmeter having a reduced flag dimension.

DETAILED DESCRIPTION
Coriolis Flowmeter in General—FIG. 1

FIG. 1 illustrates a Coriolis flowmeter 5 comprising a flowmeter sensor 10 and meter electronics 20. Meter electronics 20 is connected to meter sensor 10 via leads 100 to provide density, mass flow rate, volume flow rate, totalized mass flow, temperature, and other information over path 26. It should be apparent to those skilled in the art that the present invention can be used by any type of Coriolis flowmeter 5 regardless of the number of drivers, the number of pick-off sensors, the operating mode of vibration. Furthermore, the present invention may be used in any system that vibrates the two flow tubes 103A–103B in order to measure Coriolis effects as a material flows through the flow tube and then uses the Coriolis effect to measure a property of the material.

Flowmeter sensor 10 includes a pair of flanges 101 and 101'; manifolds 102–102'; flow tubes 103A and 103B; brace bars 120–121; driver 104; and pick-offs 105 and 105'. Flanges 101–101' are affixed to manifolds 102–102'. Manifolds 102–102' are affixed to opposing ends of flow tubes 103A–103B. Brace bars 120–121 are affixed to the flow tubes 103A–103B as described below. Driver 104 is affixed to flow tubes 103A–103B in position where the driver can vibrate flow tubes 103A–103B in opposition to one another. Pick-offs 105–105' are affixed to flow tubes 103A–103B at opposing ends to detect the phase difference in the vibrations at opposing ends of flow tubes 103A–103B.

Flanges 101 and 101' are affixed to manifolds 102–102' and connect flow tubes 103A and 103B to a pipeline (not shown). When flowmeter sensor 10 is inserted into a pipeline system (not shown) which carries the material being measured, material enters flowmeter sensor 10 through inlet flange 101 and the total amount of material is divided into two flows by inlet manifold 102 and is directed equally to enter flow tubes 103A and 103B. The material then flows through flow tubes 103A and 103B back into outlet manifold 102' which joins the separate flows. The material then flows through outlet flange 101' where it exits meter sensor 10. Manifolds 102 and 102' are made of a minimal amount of material.

Flow tubes 103A and 103B are selected and appropriately mounted to inlet manifold 102 and outlet manifold 102' so as to have substantially the same mass distribution, moments of inertia, and elastic modulus about bending axes W—W and W'—W' respectively. The flow tubes extend outwardly from the manifolds in an essentially parallel fashion.

Flow tubes 103A–B are driven by driver 104 in phase opposition about their respective bending axes W and W' and at what is termed the first out of phase bending mode of the flowmeter. Driver 104 may comprise one of many well known arrangements, such as a magnet mounted to flow tube 103A and an opposing coil mounted to flow tube 103B. An alternating current is passed through the opposing coil to cause both flow tubes 103A–B to oscillate. A suitable drive signal is applied by meter electronics 20, via lead 110 to driver 104. The description of FIG. 1 is provided merely as an example of the operation of a Coriolis flowmeter and is not intended to limit the teaching of the present invention.

Meter electronics 20 receives the right and left velocity signals appearing on leads 111 and 111', respectively. Meter electronics 20 also produces the drive signal on lead 110 which causes driver 104 to oscillate flow tubes 103A and 103B. The present invention as described herein, can produce multiple drive signals for multiple drivers. Meter electronics 20 process left and right velocity signals to compute mass flow rate. Path 26 provides an input and an output means that allows meter electronics 20 to interface with an operator. The internal components of meter electronics 20 are conventional. Therefore, a complete description of meter electronics 20 is omitted for brevity.

The configuration of Coriolis flowmeter sensor 10 allows flow tubes 103A–103B to have a smaller flag dimension while maintaining the accuracy of the readings within 0.5% of the actual mass flow rate. Flag dimension is the length that a loop in a flow tube protrudes outward from a plane that is perpendicular to the loop and that contains the connected pipeline. A second advantage of the configuration of Coriolis flowmeter sensor 10 is that a less expensive manifold and spacer may be used.

In order to have reduced flag dimension, flow tubes 103A–103B each form a semicircle 150–150' between an inlet end 151–151' and an outlet end 152–152'. The semicircle shape of flow tubes 103A–103B reduces the flag dimension by creating a continuous curve in flow tubes 103A–103B. The semicircle shape allows flow tubes 103A–103B to be of a sufficient diameter to facilitate large flow rates of material flowing through Coriolis flowmeter 5. In order to connect flow tubes 103A–103B serially into a pipeline, inlet manifold 102 and outlet manifold 102' may have a substantially 90 degree bend in a flow path to direct flow from the pipeline into flow tubes 103A–103B.

To achieve zero stability and to separate vibrational modes of the flow tubes 103A–103B, a first brace bar 120 and a second brace bar 121 are affixed to flow tubes 103A and 103B. First brace bar 120 is affixed to flow tubes 103A–103B proximate inlet end 151 to connect flow tubes 103A and 103B to control oscillations of flow tubes 103A–103B. Second brace bar 121 is affixed to flow tubes 103A–103B proximate outlet end 152 to connect flow tubes 103A and 103B to control oscillations of flow tubes 103A–103B. In a preferred exemplary embodiment, first brace bar 120 and second brace bar 121 are affixed to flow tubes 103A–103B substantially 180 degrees apart from each other.

Driver 104 is affixed to flow tubes 103A and 103B at a position that is substantially at a midpoint between inlet 151–151' and outlet 152–152' of flow tubes 103A–103B. This position allows driver 104 to apply the greatest amount of force to flow tubes 103A–103B using the least amount of power. Driver 104 receives signals from meter electronics 20 via path 110 that cause driver 104 to oscillate at a desired amplitude and frequency. In a preferred exemplary embodiment, the frequency of a vibration is substantially equal to a first out of phase bending mode of flow tubes 103A–103B which is a higher frequency than conventional Coriolis flowmeters. In order to reduce stress from the higher frequency, it is desired to maintain a low amplitude of vibration in the preferred exemplary embodiment.

In order to vibrate flow tubes 103A–103B at a high frequency and low amplitude, pick-offs 105–105' are affixed to flow tubes 103A–103B at position where the greatest amount of vibration may be sensed in flow tubes 103A–103B. This allows pick-offs 105–105' to detect the greatest amount of effect of Coriolis forces caused by the flowing material. In a preferred embodiment, the pick-offs 105–105' are positioned at a position that is substantially 30 degrees from axises w–w'. However, the pick-offs 105–105' may be placed at a position anywhere between 25 and 50 degrees from the w–w' axises when conventional electronics are used to drive the flowmeter.

Figure 2:
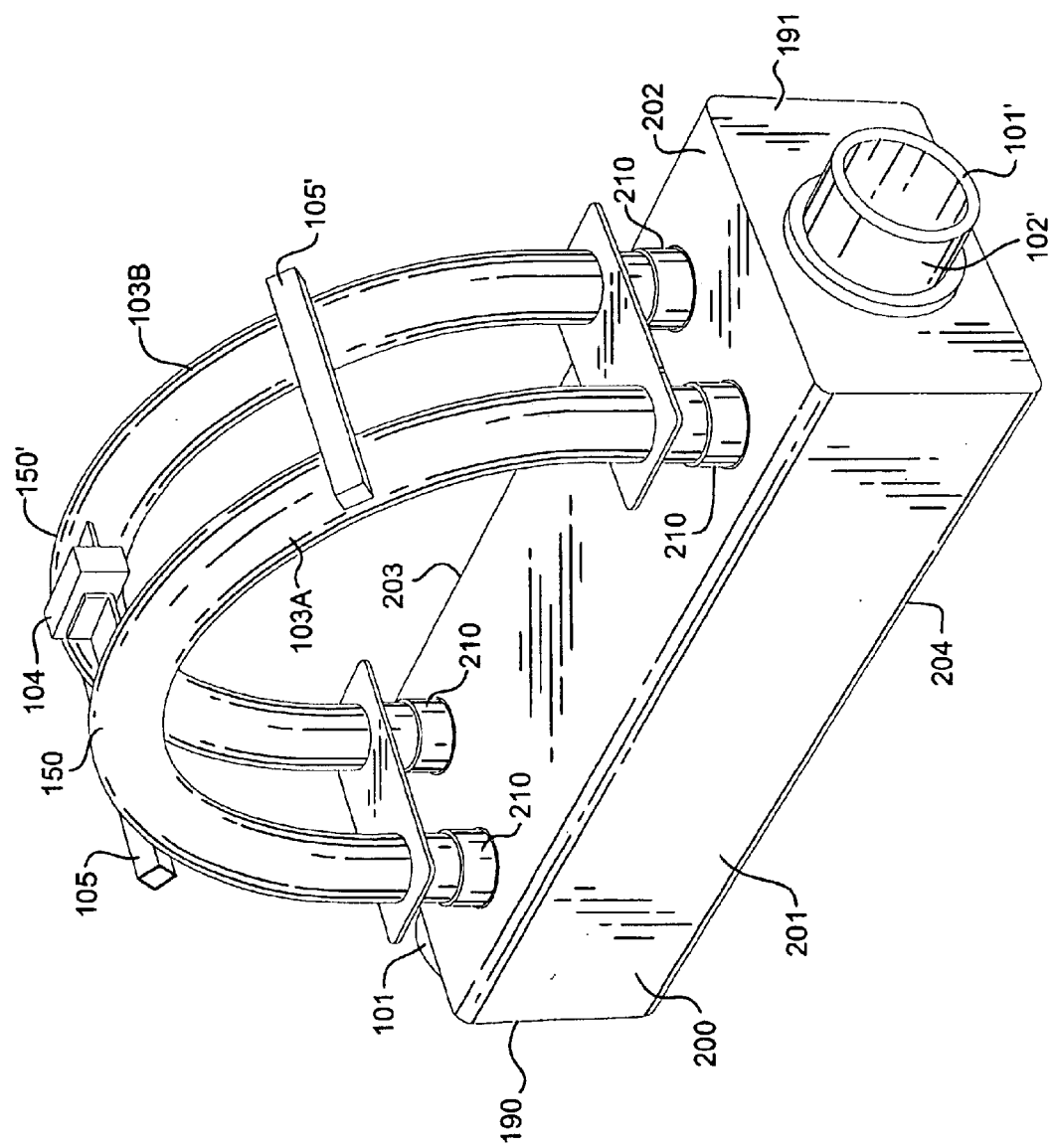
FIG. 2 illustrating a Coriolis flowmeter of this invention affixed to a spacer.

A Spacer Affixed to Manifold 102 and 102'—FIG. 2.

FIG. 2 illustrates a spacer 200 affixed to flowmeter sensor 10. Spacer 200 maintains a constant distance between inlet manifold 102 and outlet manifold 102'. Unlike conventional spacers in Coriolis flowmeters, spacer 200 is made of minimal material. Spacer 200 has square ends 190–191 on opposing sides. In a preferred exemplary embodiment, the square ends 190–191 are cast as square plates in manifolds 102–102'. Four walls represented by walls 201–204 connect each edge of square bases 190–191 to form an enclosure. Openings 210 allow flow tubes 103A–103B to protrude from spacer 200.

Figure 3:
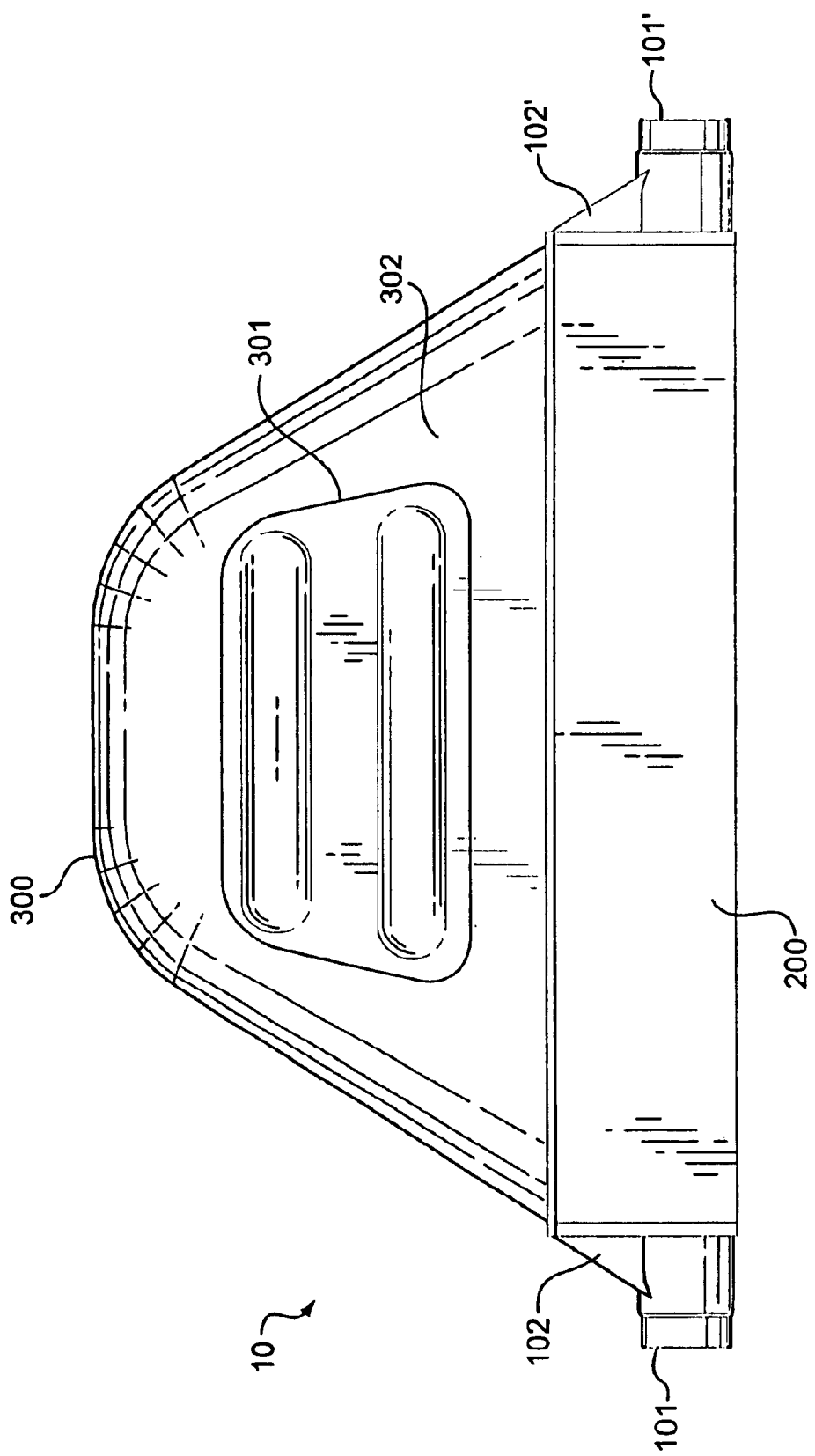
FIG. 3 illustrating a Coriolis flowmeter affixed to a spacer and enclosed in a casing.

A Casing for Flow Tubes 103A–103B—FIG. 3.

FIG. 3 illustrates a casing 300 for enclosing flow tubes 103A–103B (Shown in FIG. 1). Casing 300 is a structure having a hollow inside that fits over flow tubes 103A–103B and is affixed to spacer 200 in some manner such as a weld, or nuts and bolts. Casing 300 prevents atmosphere from entering the enclosure.

Casing 300 may resonate at a frequency that is substantially equal to the frequency of the desired mode of vibration of flow tubes 103A–103B. If this is the case it is desirable to change the resonant frequency of casing 300 to prevent misreadings of the vibrations of flow tubes 103A–103B. One solution is to affix mass 301 to a substantially flat portion 302 of casing 300. One skilled in the art will recognize that the mass may be added as part of casing 300.

The above is a description of a Coriolis flowmeter having a minimal flag dimension. It is expected that those skilled in the art can and will design other Coriolis flow meters that infringe on this invention as set forth in the claims below either literally or through the Doctrine of Equivalents.

What is claimed is:

1. A Coriolis flowmeter having a reduced flag dimension comprising:

a first flow tube having an inlet end and an outlet end, said first flow tube forming substantially a semicircle that begins at said inlet end of said first flow tube and ends at said outlet end of said first flow tube;

a second flow tube having an inlet end and an outlet end, said second flow tube forming substantially a semicircle that begins at said inlet end of said second flow tube and ends at said outlet end of said second flow tube;

a driver affixed to said first flow tube at a point on said first flow tube that is substantially perpendicular to a bending axis of said first flow tube, said driver also affixed to said second flow tube at a point on said second flow tube that is substantially perpendicular to a bending axis of said second flow tube, wherein said driver oscillates said first flow tube and said second flow tube in opposition to each other;

a first brace bar affixed to said first flow tube proximate said inlet end of said first flow tube and affixed to said second flow tube proximate said inlet end of said second flow tube;

a second brace bar affixed to said first flow tube proximate said outlet end of said first flow tube and affixed to said second flow tube proximate said outlet end of said second flow tube; and pick-offs affixed to said first flow tube and said second flow tube in a position that allows said pick-offs to detect a desired amount of Coriolis force at a low amplitude vibration.

2. The Coriolis flowmeter of claim 1 further comprising:

an inlet manifold affixed to said inlet end of said first flow tube and said inlet end of said second flow tube to affix said first flow tube and said second flow tube to a pipeline.

3. The Coriolis flowmeter of claim 2 further comprising:

a substantially 90 degree bend in a flow path through said inlet manifold.

4. The Coriolis flowmeter of claim 1 further comprising:

an outlet manifold affixed to said outlet end of said first flow tube and said outlet end of said second flow tube to connect said first flow tube and said second flow tube to a pipeline.

5. The Coriolis flowmeter of claim 4 further comprising:
a substantially 90 degree bend in a flow path though said outlet manifold.

6. The Coriolis flowmeter of claim 1 further comprising:
an inlet manifold affixed to said inlet end of said first flow tube and said inlet end of said second flow tube to affix said first flow tube and said second flow tube to a pipeline;
an outlet manifold affixed to said outlet end of said first flow tube and said outlet end of said second flow tube to connect said first flow tube and said second flow tube to said pipeline; and
a spacer affixed to said inlet manifold and said outlet manifold to maintain a fixed distance between said inlet manifold and said outlet manifold.

7. The Coriolis flowmeter of claim 6 wherein said spacer comprises:
an inlet end affixed to said inlet manifold;
an outlet end affixed to said outlet manifold;
a top side, a bottom side, a front side, and a back side each extending between said inlet end of said spacer and said outlet end of said spacer to form a rectangular body; and
openings through said top side of said spacer through which said first flow tube and said second flow tube are affixed to said inlet manifold and said outlet manifold.

8. The Coriolis flowmeter of claim 7 further comprising:
a casing that encloses said first flow tube and said second flow tube affixed to said top side of said spacer.

9. The Coriolis flowmeter of claim 8 wherein said casing comprises:
a front side wall;
a back side wall; and
a mass affixed to said front side wall and said back side wall to change vibrational modes of said casing.

10. The Coriolis flowmeter of claim 1 wherein said position of said pick-offs is substantially 25–50 degrees from said bending axis of said first flow tube and said bending axis of said second flow tube.

11. The Coriolis flowmeter of claim 10 wherein said position of said pick-offs is 30 degrees from said bending axis of said first flow tube and said bending axis of said second flow tube.

* * * * *

UNITED STATES PATENT AND TRADEMARK OFFICE
CERTIFICATE OF CORRECTION

PATENT NO. : 6,776,052 B2
DATED : August 17, 2004
INVENTOR(S) : Matthew T. Crisfield and John Richard McCarthy It is certified that error appears in the above-identified patent and that said Letters Patent is hereby corrected as shown below:

Column 5,
Lines 20, 25 and 30, each occurrence of the reference number "1038" should be changed to -- 103B --.

Signed and Sealed this

First Day of February, 2005

JON W. DUDAS
*Director of the United States Patent and Trademark Office*